US007690192B2

(12) United States Patent
Pederson et al.

(10) Patent No.: US 7,690,192 B2
(45) Date of Patent: Apr. 6, 2010

(54) COMPACT, HIGH PERFORMANCE SWIRL COMBUSTION ROCKET ENGINE

(75) Inventors: Robert J. Pederson, Thousand Oaks, CA (US); Stephen N. Schmotolocha, Thousand Oaks, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 169 days.

(21) Appl. No.: 11/805,016

(22) Filed: May 22, 2007

(65) Prior Publication Data

US 2008/0256925 A1 Oct. 23, 2008

Related U.S. Application Data

(63) Continuation-in-part of application No. 11/787,585, filed on Apr. 17, 2007.

(51) Int. Cl.
*F02K 9/28* (2006.01)
(52) U.S. Cl. ............... 60/251; 60/257; 60/258
(58) Field of Classification Search ............... 60/251, 60/257, 258, 737, 738
See application file for complete search history.

(56) References Cited

U.S. PATENT DOCUMENTS

| | | | |
|---|---|---|---|
| 2,605,608 A | 8/1952 | Barclay, Jr. | |
| 2,605,611 A | 8/1952 | Wosika | |
| 2,720,754 A | 10/1955 | Francois | |
| 2,773,350 A | 12/1956 | Barrett et al. | |
| 2,828,603 A | 4/1958 | Laucher | |
| 2,828,609 A | 4/1958 | Ogilvie | |
| 2,833,115 A | 5/1958 | Clarke et al. | |
| 3,092,964 A | 6/1963 | Martin et al. | |
| 3,103,102 A | 9/1963 | Sargent et al. | |
| 3,161,379 A | 12/1964 | Lane | |
| 3,324,660 A | 6/1967 | Lane et al. | |
| 3,576,384 A | 4/1971 | Peczeli et al. | |
| 3,618,324 A * | 11/1971 | Munding | 60/258 |
| 3,701,255 A | 10/1972 | Markowski | |
| 3,712,059 A * | 1/1973 | Drexhage | 60/258 |
| 3,901,028 A | 8/1975 | Leingang | |
| 3,925,002 A | 12/1975 | Verdouw | |
| 3,977,353 A | 8/1976 | Toyama | |
| 4,073,138 A * | 2/1978 | Beichel | 60/245 |
| 4,185,457 A | 1/1980 | Parker et al. | |
| 4,220,001 A | 9/1980 | Beichel | |
| 4,263,780 A | 4/1981 | Stettler | |
| 4,343,147 A | 8/1982 | Shekleton | |

(Continued)

FOREIGN PATENT DOCUMENTS

GB         754141         8/1956

(Continued)

OTHER PUBLICATIONS

Inventor: Robert J. Pederson, U.S. Appl. No. 11/787,585, filed Apr. 17, 2007.

*Primary Examiner*—Michael Cuff
*Assistant Examiner*—Phutthiwat Wongwian
(74) *Attorney, Agent, or Firm*—Carlson, Gaskey & Olds (57) ABSTRACT

A rocket engine includes a combustor assembly for carrying out a combustion process of fuel and oxidizer rocket propellants to produce thrust. A swirl generator is positioned within the combustor assembly to produce a turbulent flowfield of the fuel and oxidizer rocket propellants within the combustor assembly.

22 Claims, 5 Drawing Sheets

U.S. PATENT DOCUMENTS

| | | | |
|---|---|---|---|
| 4,461,146 A | 7/1984 | DuBell | |
| 4,470,262 A | 9/1984 | Shekleton | |
| H000019 H | 2/1986 | Carlson | |
| 4,598,553 A | 7/1986 | Saito et al. | |
| 4,648,571 A | 3/1987 | Gerhardt | |
| 4,686,826 A | 8/1987 | Koshoffer et al. | |
| 4,894,986 A * | 1/1990 | Etheridge | 60/258 |
| 4,896,502 A | 1/1990 | Ravel et al. | |
| 4,919,364 A | 4/1990 | John et al. | |
| 5,101,633 A | 4/1992 | Keller et al. | |
| 5,240,404 A | 8/1993 | Hemsath et al. | |
| 5,251,447 A | 10/1993 | Joshi et al. | |
| 5,311,735 A | 5/1994 | Orlando | |
| 5,319,923 A | 6/1994 | Leonard et al. | |
| 5,319,935 A | 6/1994 | Toon et al. | |
| 5,411,394 A | 5/1995 | Beer et al. | |
| 5,511,970 A | 4/1996 | Irwin et al. | |
| 5,675,971 A | 10/1997 | Angel et al. | |
| 5,685,142 A | 11/1997 | Brewer et al. | |
| 5,779,169 A | 7/1998 | Sloan | |
| 5,845,480 A | 12/1998 | DeFreitas et al. | |
| 6,301,900 B1 | 10/2001 | Mandai et al. | |
| 6,374,615 B1 | 4/2002 | Zupanc et al. | |
| 6,748,735 B2 | 6/2004 | Schmotolocha et al. | |
| 6,820,411 B2 | 11/2004 | Pederson et al. | |
| 6,865,878 B2 * | 3/2005 | Knuth et al. | 60/258 |
| 6,895,756 B2 | 5/2005 | Schmotolocha et al. | |
| 6,907,724 B2 | 6/2005 | Edelman et al. | |
| 6,912,857 B2 | 7/2005 | Schmotolocha et al. | |
| 6,968,695 B2 | 11/2005 | Schmotolocha et al. | |
| 7,137,255 B2 | 11/2006 | Schmotolocha et al. | |
| 7,168,236 B2 | 1/2007 | Schmotolocha et al. | |

FOREIGN PATENT DOCUMENTS

| | | |
|---|---|---|
| GB | 774059 | 5/1957 |

\* cited by examiner

COMPACT, HIGH PERFORMANCE SWIRL COMBUSTION ROCKET ENGINE

CROSS-REFERENCE TO RELATED APPLICATION

This is a continuation-in-part application of application Ser. No. 11/787,585 entitled "ULTRA COMPACT HIGH PERFORMANCE AEROVORTICAL SWIRL DUMP COMBUSTION ROCKET ENGINE" and filed Apr. 17, 2007 by Robert J. Pederson and Stephen N. Schmotolocha, now pending.

BACKGROUND

The present invention is applicable to a class of rocket engines that provide vacuum thrust covering a range of approximately 500 $lb_f$-20,000 $lb_f$ and 25,000 $lb_f$-100,000 $lb_f$, featuring advanced swirl combustion, and can be used to meet the throttling propulsion needs for traveling to the Moon, Mars and beyond.

The liquid propulsion engine upper stage and spacecraft rocket engine market, continues to receive emphasis, especially for storable non-toxic and cryogenic propellant systems, high expansion nozzles and orbit maneuvering systems. For current upper stage Expendable Launch Vehicles (ELV), the generated vacuum thrust varies from approximately 25,000 $lb_f$-60,000 $lb_f$ for Atlas 5 and the Delta-IV (small, medium and heavy) launch vehicles. Future potential growth is anticipated in this mid-thrust range liquid ELV rocket propulsion market, with expected vacuum thrust needed in the range of approximately 25,000 $lb_f$ to about 100,000 $lb_f$.

The recent published NASA Exploration Systems Architecture Study (ESAS) reviewed numerous propulsion options to determine how the Crew Exploration Vehicle (CEV) and the Crew Launch Vehicle (CLV) could be utilized to transport both crew and cargo to the International Space Station (ISS), as well as transportation of crew and cargo to the Moon and Mars. The ESAS concluded that a variety of propulsion technologies are required to be developed in order to support missions to the ISS, returning to the Moon, and future missions to Mars. There were three new propulsion project recommendations from the ESAS architecture to support the above missions: (1) human-rated, 5,000 $lb_f$-20,000 $lb_f$ class in-space propulsion engines to support the Service Module (SM) for ISS orbital operations, lunar ascent and Trans-Earth Injection; (2) human-rated deep throttleable 5,000 $lb_f$-20,000 $lb_f$ thrust class engines for lunar descent; and (3) human-rated pressure/pump-fed 5,000 $lb_f$-20,000 $lb_f$ thrust class engines for the upgraded Lunar Surface Access Module (LSAM) ascent stage.

The above architecture study specified a high specific impulse (Isp) propulsion system for the SM and lunar ascent that would provide high reliability without significant propellant boil-off. A human rated 5,000 $lb_f$-20,000 $lb_f$ pressure/pump fed Liquid Oxygen (LOX)/Methane (CH4) in-space propulsion engine has been specified in the study for both the SM and LSAM ascent stage and for the upgraded pump-fed version.

For the LSAM descent stage, a throttleable 5,000 $lb_f$-20,000 $lb_f$ pressure/pump-fed (gas generator or expander turbopump feed system), deep-throttling engine has been identified to support the return to the Moon. The propellants chosen consist of LOX/liquid hydrogen (LH2). The LOX/LH2 pump-fed propulsion engine was selected for the lunar descent stage due to its higher Isp performance, lower cost and risk level relative to a pressure-fed system, which will allow the LSAM to perform a circular burn, yet maximize the LSAM cargo delivery capability. Furthermore, these engines must have a restart capability for lunar descent and the ability to throttle down to 10 percent of the total thrust. Conversely, common pressure-fed LOX/CH4 engines were chosen for the CEV Service Module and lunar ascent stage propulsion systems in order to attain high reliability performance engines with similar propellants.

Thus, there is a need to develop versatile rocket propulsion engines to support NASA's near-term propulsion requirements with vacuum thrust throttling capability at least covering the 5,000 $lb_f$-20,000 $lb_f$ range using LOX/LH2 and LOX/CH4 for orbital maneuvering, Lunar and Mars descent, landing and ascent, as well as a complimentary vacuum thrust ranging up to approximately 60,000 $lb_f$ and beyond to address Trans-Earth Orbital Insertion from Mars and Trans-Lunar/Mars Insertion, Mars/Lunar surface hopping, as well as for other applications. Additionally, mid-thrust propulsion engines in the 25,000 $lb_f$-100,000 $lb_f$ vacuum thrust range are expected to be required to support the future ELV upper stage market.

Compact Advanced Swirl-combustion Propulsion (CASP) technology that can be used in a broad range of rocket-based and air-breathing propulsion applications has recently been successfully developed and test demonstrated. It is simple and has no moving parts. The swirl generator is the central key feature of the CASP technology, which enables robust mixing of propellants, flame stabilization and flame propagation that produces near complete combustion over a wide range of compact combustor lengths and diameters.

CASP technology was originally developed and tested as an auxiliary ramjet thrust propulsion system to provide additional lift thrust augmentation for the Boeing Joint Strike Fighter (JSF) Short Take-off Vertical Landing aircraft (See "COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION," U.S. Pat. No. 6,820,411 by Pederson et al., which is incorporated by this reference.) Using jet propulsion fuels and simulating air off-take from the JSF gas turbine engine fan, the ground-tested swirl ramjet engine delivered very high engine performance margins (nearly ideal) that consisted of a measured gross fuel specific impulse of 3300 to 2100 seconds (ideal fuel Isp is 3500 to 2300 seconds), with corresponding combustion efficiencies of 99% to 90% over an equivalence ratio (fuel/air ratio) range of 0.5 to 1.0. Propulsive efficiency of the CASP engine was approximately constant at 93% over mid to high equivalence ratio ranges (growth capability to about 96%) and consistently higher than historical ramjet Lightweight engines, yet the CASP combustor length was 36% shorter. Test-to-test performance repeatability of the CASP was excellent, with excursions below ±2.2%. The tested combustor/convergent nozzle length to combustor diameter ratio, L/D, was only 1.6, with further potential for reducing the L/D down to 1.0 or less. In an airbreathing ramjet configuration, the CASP technology was tested with extreme length constraints and at very difficult operating flight conditions compared to typical ramjets, which can adversely affect fuel injection, ignition and combustion stability, yet these were overcome and 5:1 engine throttleability was test demonstrated. The CASP technology also demonstrated smooth combustion (high frequency pressure fluctuations<5%), which underscores the viability and practicality of this developed technology.

The swirl generator design is quite flexible and has been implemented in many other propulsion applications with similar benefits. For example, it has been employed to introduce novel: (1) Compact, Lightweight Ramjet Engines Incorporating Swirl Augmented Combustion With Improved Performance, (see U.S. Pat. Nos. 6,968,695 and 7,137,255 by S. Schmotolocha et al.); (2) Compact Swirl Augmented Afterburners for Gas Turbine Engines (see U.S. Pat. Nos. 6,895, 756 and 7,137,255 by Schmotolocha et al.); and (3) Combined Cycle Engines Incorporating Swirl Augmented Combustion for Reduced Volume and Weight and Improved Performance (see U.S. Pat. No. 6,907,724 by R. Edelman et al.).

This propulsion technology that was originally developed for airbreathing applications could also be applied to liquid rocket engines, which could lead to the next generation of ELV's and support NASA's propulsion requirements for the return to the Moon, as well as future Mars missions. There is great potential for transferring this advanced swirl propulsion technology from airbreathing propulsion engines to rocket engines. The resulting key benefits to NASA, DoD and the commercial launch market for small-to-medium size rocket engines (500 to 100,000 $lb_f$ thrust range) would include: (1) a significant reduction in combustor length, weight and complexity; (2) a greater nozzle expansion ratios to provide higher vacuum Isp can be introduced into fixed rocket engine lengths due to shorter combustor length; (3) reduced combustor cooling requirements due to a shorter combustor length; (4) improved engine performance (high Isp) and operability; (5) engine throttling ability; and (6) enhanced safety and lower system part count, which results in reduced complexity and manufacturing cost. The CASP propulsion system is highly reliable and the attendant propellants injection approach is extremely flexible. The latter allows the engine design to be tuned to achieve near maximum theoretical performance (thrust, Isp, propulsive and combustion efficiencies).

These advantages would not be limited to a specific rocket engine type, but can be applied to a wide variety of medium-to-small rocket engine sizes. Typical feed systems used to fuel rocket propulsion combustors, such as simple gas pressure or turbo-pump feed systems, have limited throttling ratios (the rocket engine's maximum thrust capability compared to the minimum thrust capability). Gas pressure feed systems are capable of achieving throttling ratios of approximately 10:1, such as the pressure-fed Apollo descent engine. Turbo-pump feed systems currently achieve throttling ratios of 5:1. Additionally, a rocket engine that utilizes a gas pressure feed system operating at low tank pressure and low combustion chamber pressure ($P_c$) results in an undesirably large sized rocket engine that has poor propulsion performance. Conversely, if the same rocket engine is required to operate at high $P_c$ and high tank pressure, the weight of tank increases to an undesirable size and weight. Turbo-pump feed systems allow rocket engines to operate at a high $P_c$ and a low tank pressure, and simultaneously provide higher propulsion performance than a simple gas pressure feed system. This rocket engine is, however, significantly more complex and, as with the gas pressure feed system, is unproven for use with CASP technology. Thus, there is a need for the swirl combustion technology to be incorporated into small to medium size rocket engines to provide high throttling capability for either a gas pressure or a turbo-pump feed system that uses the fuel in a regenerative cooling approach to cool the MCC and nozzle, resulting in smaller and lighter vehicles with high performance. This new type of rocket engine design would be a significant improvement over traditional rocket engine design for space applications.

SUMMARY

The present invention is directed toward a rocket engine that provides vacuum thrust in approximately the 500 $lb_f$-20,000 $lb_f$ and 25,00 $lb_f$-100,000 $lb_f$ range. Components of the rocket engine include a feed system, combustor assembly, swirl generator and a nozzle. The feed system delivers an oxidizer and a fuel to the combustor assembly in the appropriate phase (liquid or gas) suitable for use with the swirl generator, while the combustor assembly carries out the combustion process of fuel and oxidizer, and the nozzle expands the flow and produces thrust. The swirl generator, positioned within the combustor assembly, causes a highly-turbulent three-dimensional swirling central recirculation zone to form in the combustor that is used for flame stabilization and robust flame propagation. Gaseous oxidant or fuel is introduced axially and swirled. A second liquid combustion constituent is then injected into this swirling turbulent flowfield followed by vigorous atomization, vaporization, mixing and combustion. These aerothermodynamic processes are extremely efficient and consequently produce near ideal thrust levels. The benefits of using the CASP swirl combustion technology are the ability to significantly reduce combustor length, weight, complexity and cost, yet provide high propulsion efficiencies and wide rocket engine throttling operability. In one embodiment, the swirl generator can be integrated into a high thrust, dual-throat, expansion/deflection rocket engine to provide deep throttleability with high Isp that meets propulsion needs for traveling to the Moon, Mars and beyond.

DETAILED DESCRIPTION

Figure 1:
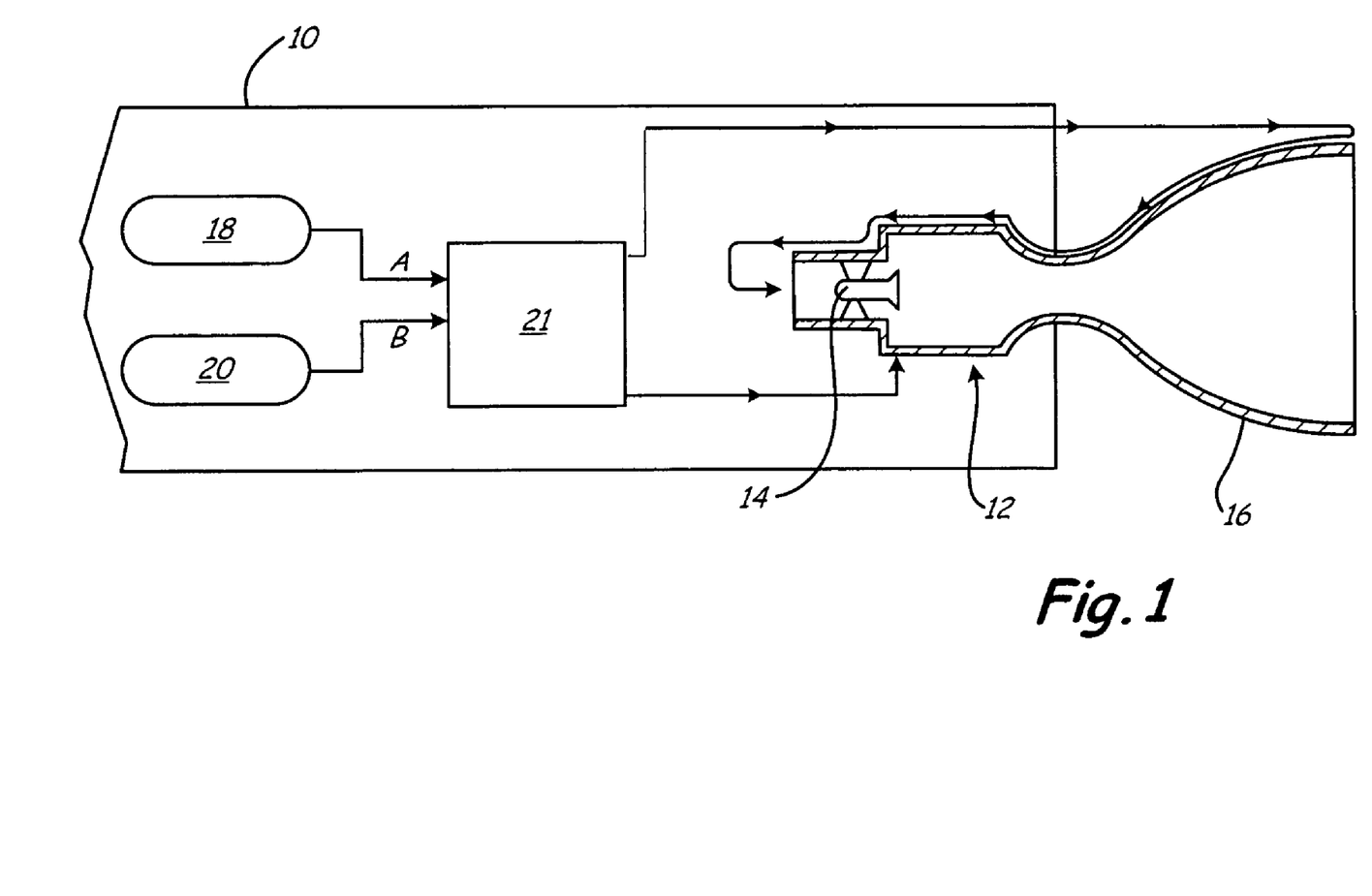
FIG. 1 shows a schematic of a compact, high performance swirl combustion rocket engine of the present invention.

FIG. 1 shows a schematic of compact, high performance, swirl combustion rocket engine 10 of the present invention. Rocket engine 10 is comprised of a swirl-enhanced combustor 12, swirl generator 14, convergent/divergent nozzle 16, first storage tank 18 for propellant A, a second storage tank 20 for propellant B, and feed system 21. Rocket engine 10 carries a supply of propellants A and B, typically a fuel and an oxidizer, within tanks 18 and 20 for use in a combustion process within combustor 12 necessary for generating thrust for propelling rocket engine 10. Liquid propellants A and B are supplied to swirl-enhanced combustor 12 through gas pressure feed system 21, whereby a variety of fuel injectors, such as positioned on combustor 12 inlet wall or within swirl generator 14, distribute propellants A and B for use in the combustion processes. In one embodiment, feed system 21 comprises a pressurized feed system, and in other embodiments feed system 21 comprises a turbo-pump feed system. Feed system 21 ensures that propellants A and B are delivered to combustor 12 in a phase suitable for use with swirl generator 14 and also performs regenerative heat transfer cooling of combustor 12 and convergent/divergent nozzle 16.

Swirl generator 14 imparts a highly turbulent three-dimensional aerodynamic flow structure into the flowstream of first propellant A as it passes through to combustor 12. Into this swirling flow system of propellant A, second propellant B is injected, mixed and burned. As combustion progresses downstream inside the swirl-dump combustor 12, the radial and tangential components of the burning swirl flow, rapidly decay throughout combustor 12 and nozzle 16 due to the design of swirl generator 14, thereby reducing the required length and diameter of combustor 12. Byproducts of the combustion process are passed through nozzle 16, which is located at the downstream end of swirl combustor 12, to produce additional thrust. Thus, rocket engine 10 incorporates feed system 21 to optimally deliver propellants A and B to combustor 12, and swirl generator 14 to optimally mix propellants A and B within combustor 12 to achieve a compact, high performance rocket engine with medium to large thrusting capabilities.

Figure 2A:
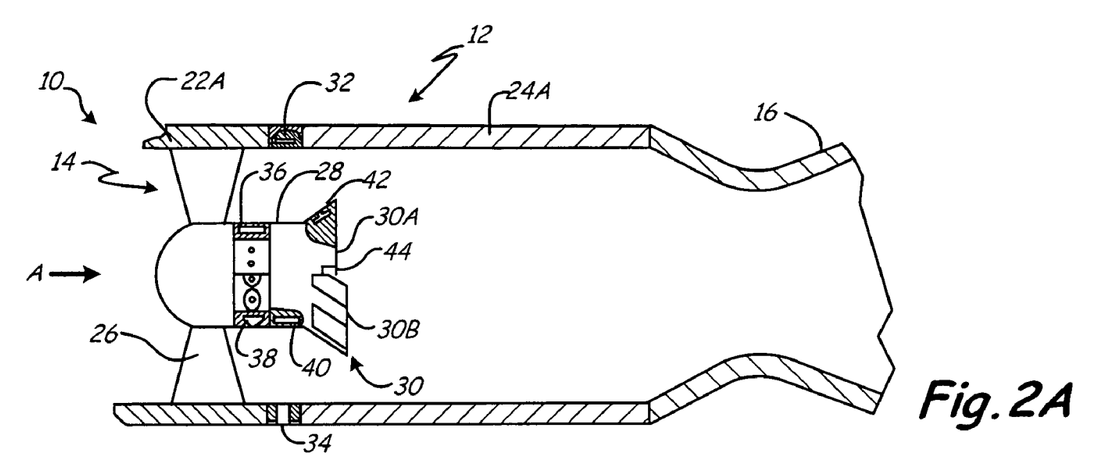
FIG. 2A shows a rocket engine combustor featuring a propellant swirl generator having a straight combustor for use in the rocket engine of FIG. 1.

FIG. 2A shows a first embodiment of rocket engine 10 of the present invention, comprising combustor 12, swirl generator 14, convergent/divergent nozzle 16, delivery duct 22A and combustion chamber 24A, for use with liquid rocket propellants A and B. Inlet delivery duct 22A directs propellant A to the swirl generator 14, which is comprised of swirl vanes 26, centerbody 28, bluffbody 30, and injectors 32, 34, 36, 38, 40, 42 and 44 for introducing propellant B into combustion chamber 24a enclosed by the wall.

Figure 2B:
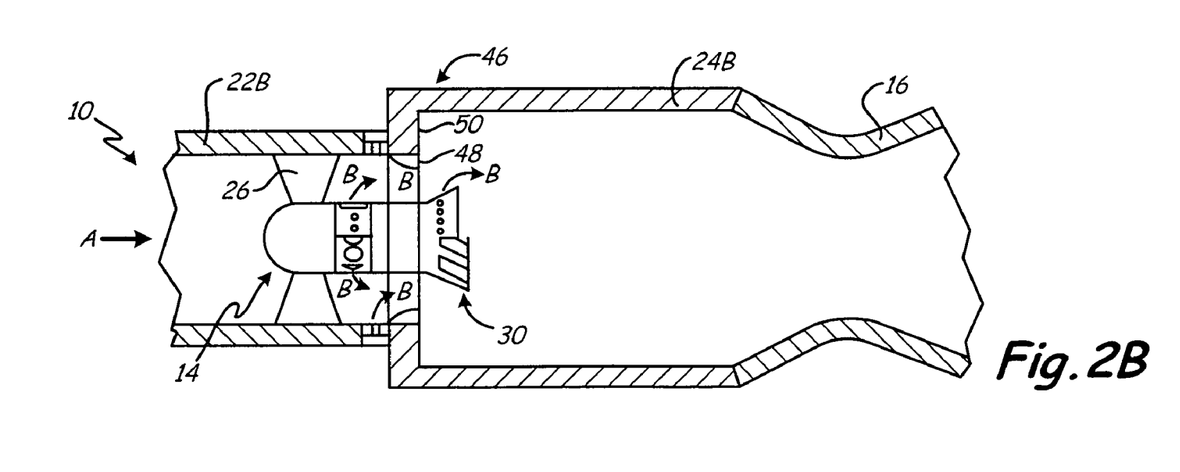
FIG. 2B shows a rocket engine combustor featuring a propellant swirl generator having a dump-step combustor for use in the rocket engine of FIG. 1.

FIG. 2B shows swirl-enhanced combustor 46, which includes similar components as combustor 12, such as inlet delivery duct 22B and combustion chamber 24B, in addition to ramp 48 and dump-step 50. Swirl generator 14 is positioned at the entrance of combustion chamber 24A or 24B for use with combustor 12 and swirl-dump combustor 46, respectively. In combustor 12, inlet delivery duct 22A and combustion chamber 24A align coaxially to form a generally straight propellant flow path, with swirl generator 14 being positioned such that bluffbody 30 is positioned downstream of injectors 32 and 34. In combustor 46, inlet delivery duct 22B has a smaller diameter than combustion chamber 24B, which is further reduced by ramp 48. Inlet delivery duct 22B and combustion chamber 24B are connected by dump-step 50. Together ramp 48 and dump-step 50 provide an expansion in the propellant flow path. Dump-step 50 can be configured as a ninety degree step as illustrated in FIG. 2B, or somewhat less to form a quarl, or be a rounded or elliptical dome, or any other geometric shape that aerodynamically simulates an efficient dump step. In combustor 46, swirl generator 14 is positioned such that bluffbody 30 is positioned downstream of ramp 48 and dump-step 50. The position of swirl generator 14, however, may be adjusted in other embodiments.

In either embodiment, swirl generator 14 improves mixing of the two propellants A and B and then considerably accelerates their combustion process to completion in much shorter combustor length to produce nearly ideal thrust performance. An axial flow stream of a first propellant A enters the delivery duct 22A or 22B and is directed through swirl generator 14. A plurality of stationary swirl vanes 26 are attached to the delivery duct 22A or 22B at the tip and to the centerbody 28 at the root such that they sit in a predetermined angle to the incoming flow of propellant A. Centerbody 28 extends downstream of the swirl vanes 26, then terminates with bluffbody 30. The downstream end of the centerbody 28 is directly integrated with bluffbody 30. FIGS. 2A and 2B depict both a solid-flared conical bluffbody 30A and a channeled bluffbody 30B. However, other bluffbody concepts, such as a hollow cone bluffbody that could house fuel injector 44 or an igniter are possible.

In FIGS. 2A and 2B the flow stream of first propellant A enters swirl generator 14, and swirl vanes 26, which impart radial and tangential velocities, causing a change in the flow direction and produces a swirling, highly turbulent, three-dimensional flowfield having a large central recirculation zone (CRZ) downstream of bluffbody 30, and a toroidal outer recirculation zone (ORZ) downstream of dump-step 50 (FIG. 2B). The flow stream continues downstream from swirl generator 14, over centerbody 28 and bluffbody 30. Second propellant B is injected into the turbulent swirling flow of propellant A downstream of swirl vanes 26, whereupon the two constituents mix while entering combustion chamber 24A or 24B. Bluffbody 30 anchors the CRZ vortex and the dump-step anchors the ORZ vortex such that combustion is stabilized by either bluffbody design 30A or 30B and/or dump-step 50. Swirl vanes 26 enable swirl generator 14 to produce robust mixing, and together with bluffbody 30 and dump-step 50 improve the combustion process, thereby facilitating the use of high-performance swirl-dump combustors 12 and 46 in rocket engine 10.

Figure 3:
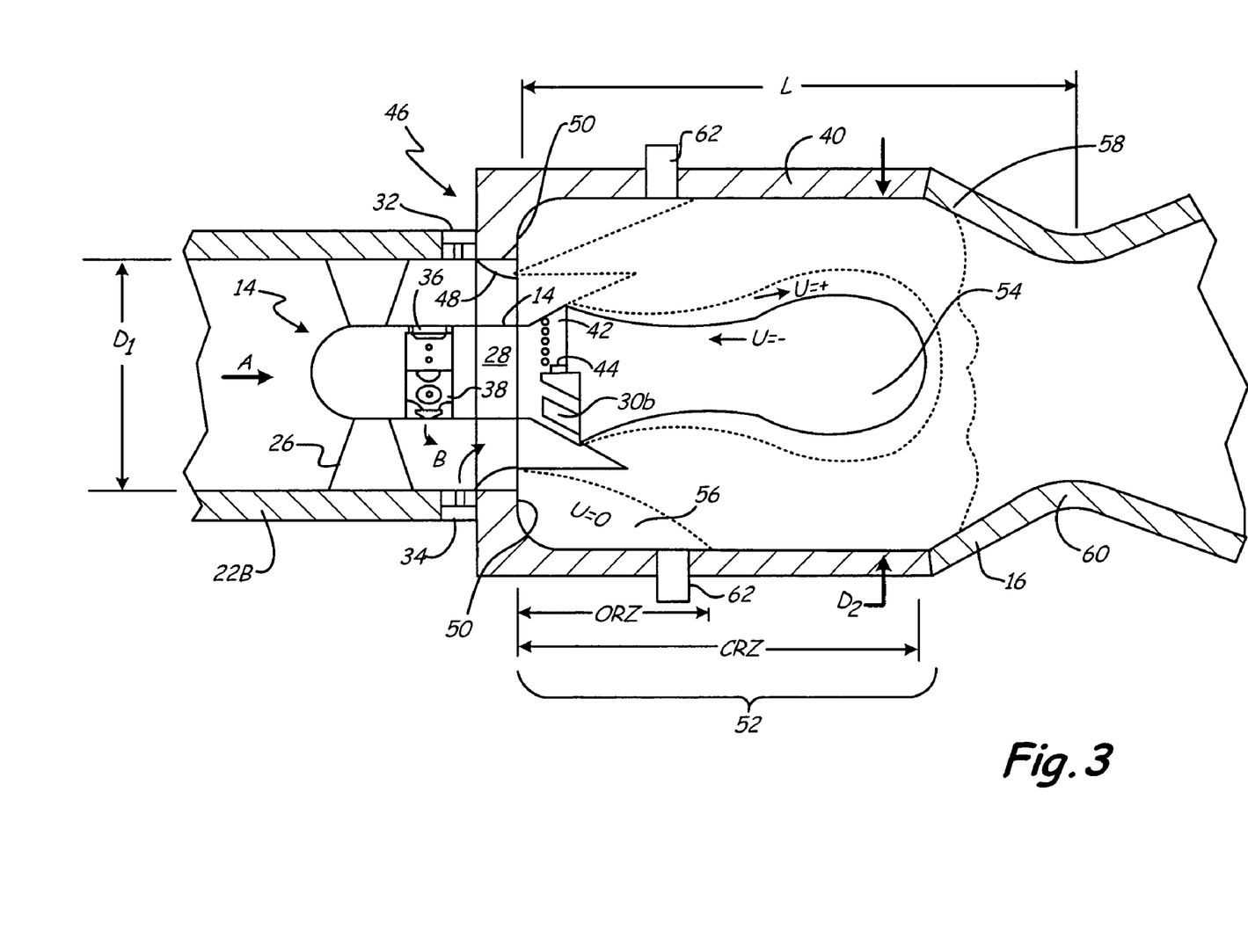
FIG. 3 shows the resulting combustion flowfield for a rocket engine with a swirl generator and a dump-step combustor such as that of FIG. 2B.

FIG. 3 shows a cross-section of a swirl-dump combustor 46 of FIG. 2B and its resulting aerodynamic flowfield 52 for use in a rocket engine 10 of the present invention. Swirl-dump combustor 46 is comprised of a swirl generator 14, convergent/divergent nozzle 16, delivery duct 22B, combustion chamber 24B, swirl vanes 26, wall injectors 32 and 34, centerbody injectors 36 and 38, bluffbody injectors 42 and 44, ramp 48 and dump-step 50 to achieve robust mixing and high-performance combustion in a short combustor length to diameter ratio, L/D, of 1.6 and less. Propellant A is introduced into inlet delivery duct 22B from tank 18 by feed system 21 (FIG. 1). Swirl-dump combustor 46 contains a plurality of injectors, including bluffbody injectors 42 and 44, centerbody injectors 36 and 38, and wall injectors 32 and 34 for injecting second propellant B from tank 20 and feed system 21 (FIG. 1) into inlet delivery duct 22B. Propellants A and B comprise combustion constituents appropriate for use with swirl generator 14, such as cryogenic liquid oxygen (LOX), gaseous hydrogen (GH2), gaseous methane (GCH4), gaseous oxygen (GOX), liquid kerosene (LRP-1), or some other hydrocarbon fuel. However, depending on design specifications, other embodiments of swirl-dump combustor 46 or combustor 12 could utilize other types of propellant oxidizer/fuel combinations.

Injectors 32-34 can be positioned in various combinations and positions along the circumference of inlet delivery duct 22B, such as wall injectors 42 and 44, which in this example are flush to the inner wall and/or they can be protruding into the flow stream. Moreover, injectors can also be located circumferentially along centerbody 28, as shown with injectors 36 and 38, or along bluffbody 30, such as bluffbody injectors 42 and 44. Injectors 32 through 44 may comprise orifice type, pressurized simplex/duplex type, fan spray atomizer injectors, variable area injectors or other types as those who are skilled in the art are familiar with. All injectors of the present invention are located downstream of the swirl vanes 26 to reduce the potential for flame flashback and to mitigate damage to these blades.

While mixing, propellants A and B pass over ramp 48 and by dump-step 50, bluffbody 30 and enter combustion chamber 24B, so that CRZ 54 and ORZ 56 are established within combustion chamber 24B. Swirl generator 14 creates a highly turbulent, three-dimensional flowfield with CRZ 54 as the main flame stabilization mechanism. CRZ 54 is a large-scale vortex which is anchored by the downstream end of the bluffbody 30A or 30B, and is the primary recirculation zone. The size and strength of the vortex of CRZ 54 determines and controls flame parameters including stability, combustion intensity, and residence time distributions. CRZ 54 is disposed inwardly of the toroidally shaped ORZ 56. ORZ 56 is the second recirculation zone that is created by flow stream separation as first propellant A passes over dump step 50. Both recirculation zones CRZ 54 and ORZ 56 are encased by very high-turbulence swirling shear layers 58. The combined shear layers 58 straddle the boundaries between the recirculation zones and mixing zones. High shear stresses of shear layers 58 are manifestations of high turbulence intensity and a multitude of small-scale vortices, controlled by a combination of swirl intensity and flow velocity levels. The main combustion then takes place within shear layers 58, while CRZ 54 and ORZ 56 stoke the main flames, keeping them self-sustained and stable, and promote robust combustion and lateral flame propagation. Specifically, both CRZ 54 and ORZ 56 are dominated by low-velocity recirculating flows, provide flame stabilization to the entire combustion process by supplying a heat source of combustion products to initiate and maintain the main combustion process. Each recirculation zone takes the heat from the shear layer flame, augments it and carries it upstream to ignite the fresh combustible mixture sustained in the shear layer as it comes in contact with it. Injectors 32 through 44 are positioned such that the second propellant B will be optimally injected into CRZ 54 and ORZ 56 to mix with constituent A. Centerbody injectors 36 and 38 are advantageous to pilot CRZ 54 and fine tune combustion performance during throttling.

The combination of either a solid flare bluffbody 30A or a channeled bluffbody 30B design and the inclusion or exclusion of centerbody 28 allow for flexible design options to control swirl and stabilization of the combustion processes. Although, the present embodiment includes centerbody 28, the present invention also includes designs excluding the centerbody portion of a swirl generator 14. The inclusion of centerbody 28 offers flexibility for fuel injection options and adjusting the axial position of bluffbody 30 relative to the dump-step for modifying the merging of the shear layers of CRZ 54 and ORZ 56 and ultimately mixing rates and turbulence levels.

For illustration, bluffbody 30 is shown having a solid-flared conical bluffbody 30A, together with channeled bluffbody 30B. Solid conical bluffbody 30A is flared such that turbulence is produced in the downstream flow of propellant A within combustor wall 24B. In order to further produce turbulence and swirl within the flow of propellant A, bluffbody 30 can include channels such as that of channeled bluffbody 30B, thus offering another option in design preference.

Bluffbody 30A or 30B increases the size and volume of CRZ 54 and its entrainment rates, and deflects CRZ 58 shear layer outer boundary radially further outward into the flow stream for earlier interception and merging with ORZ 56 shear layer outer boundary to improve the concomitant mixing and combustion processes. In one embodiment of the present invention, channeled bluffbody 30B includes a thirty-degree flare having ten channels, but these parameters can be adjusted to produce the desired amount of turbulence in the flowfield. Channeled bluffbody 30B is designed and sized to maintain the same flow stream blockage as the solid flared bluffbody 30A (as seen in FIG. 2A or 2B).

Dump step 50 is shaped as a ninety degree step that helps produce and stabilize ORZ 56. Alternatively, dump step 50 could have an angle less than ninety degrees; e.g., quarl shaped. Dump step 50 produces and stabilizes ORZ 56, while ramp 48 compresses propellants A and B, intensifies ORZ 56 and CRZ 54 shear layers and increases the amount of mass entrainment into them. As the mixed propellants flow over the ninety degree dump step 50, the flow stream separates and a toroidal ORZ 56 is created. The length of ORZ 56 is controlled by the height of the step and the strength of the swirl. For example, a higher dump-step creates a larger and more robust ORZ 56, but a stronger swirl reduces the size and intensity of the ORZ 56. As can be seen, to achieve maximum rocket engine thrust performance requires optimization of these two parameters, but of course not to the exclusion of the other parameters already discussed.

An ignition source is used to initiate the combustion process of constituents A and B as they enter and mix in combustion chamber 24B. Igniters 62 are placed along the dump-step region of the wall of combustor 46. Additionally, dump-step igniters or a bluffbody igniter may be used in addition to or alternatively to igniter 62, as is dictated by design variances in combustor 46. An ignition source releases heat and therefore is required to initiate the reaction of propellants A and B, which will then become self sustaining due to the CRZ and ORZ produced by swirl generator 14. Typical ignition sources for liquid rocket engines include pyrotechnic devices, hypergolic (third propellant like TEA/TEB), direct spark system, spark torch, combustion wave system, etc. Once ignition commences, the igniter is no longer used. The main combustion takes place within shear layers 58, while CRZ 54 and ORZ 56 stoke the main flames, keeping them self-sustained and stable, and promote robust combustion and lateral flame propagation. Specifically, both CRZ 54 and ORZ 56, are dominated by low-velocity recirculating flows, provide flame stabilization to the entire combustion process by supplying a heat source of combustion products to initiate and maintain the main combustion process. Each recirculation zone takes the heat from the shear layer flame, augments it and carries it upstream to ignite the fresh combustible mixture sustained in the shear layer as it comes in contact with it. Combustion is completed, for all practical purposes, before reaching nozzle throat 60.

Swirl-dump combustor 46, utilizing the benefits of swirl vanes 26, bluffbody 30, ramp 48 and dump-step 50, imposes a vortical flow that enhances mixing and promotes rapid, highly intense, and more efficient combustion, yet in a very short combustor length. Then the products of combustion are accelerated through a convergent/divergent nozzle 16 to produce thrust. Further in-depth description of swirl mixing and combustion processes used in the present invention is found in the aforementioned U.S. Pat. No. 6,820,411 to Pederson et al.

The combination of these aerodynamic flowfield features, produced by swirl generator 14, provides faster and more robust mixing at much higher turbulence intensity and scale levels, improves fuel atomization and vaporization, and promotes vigorous combustion. As a consequence, length L of the combustion chamber 24B and the convergent section of convergent/divergent nozzle 16 can be significantly reduced, yet propulsion performance (combustion efficiency, pressure recovery and net thrust) remains very high. Previously, advanced swirl-combustion propulsion (CASP) technology has been used to reduce traditional air-breathing ramjet, gas turbine afterburners and combined cycle engine combustor length by 50% or more (see U.S. Pat. Nos. 6,968,695 and 7,168,236 for ramjets; 6,895,756 and 7,137,255 for gas turbine afterburners; and 6,907,724 for combined cycle engines), while improving engine performance.

The benefits of a high-performance swirl combustor are advantageous for use in rocket propulsion engines or thrusters, particularly those with weight and volume limitations. For example, swirling the combustible flow stream enhances overall combustion performance by improving: mixing; atomization; evaporation; flame propagation and spreading rates; combustion efficiency and stability; and increased flammability limits, which all help to reduce combustor size. Thus, according to the present invention, swirl generator 14 and combustors 12 and 46 are combined with feed system 21 and implemented into various rocket engines configurations, as shown schematically in FIGS. 4A-4C to, for example, achieve NASA's new objectives to go to the Moon, Mars and beyond.

Preliminary studies were carried out to determine what fuel types would be compatible with swirl combustion technology, and what size swirler would be needed. For example, the feasibility of replacing the swirled inlet air, as was previously demonstrated in the airbreathing Lift Thrust Augmentor propulsion application described in the aforementioned U.S. Pat. No. 6,820,411 by Pederson et al., with cyrogenic or gaseous oxygen/hydrogen. Preliminary wall and centerbody injection sizing studies were conducted to assess the feasibility of using LOX and GH2 at total pressures of 2500 psia and 2000 psia, respectively, over a temperature range of 50 R to 700 R in a 60,000 $lb_f$ rocket engine using swirl-dump combustion. Key geometric sizing parameters of this 60K $lb_f$ engine design include a combustor length and diameter of 8.1/6.8 inches (combustor L/D=1.6, which is a reduction of ~60% from the engine balance combustor length of 20.85 inches without using swirl combustion technology), nozzle contraction and expansion ratios of 2.5 and 274 and a combustor-to-inlet area ratio of 2.25. Over these temperature and pressure operating ranges, all cases examined were found to indicate reasonable injection orifice diameters sizes, with the lower oxidizer and fuel temperatures being more attractive from a packaging standpoint. A similar sizing study was carried out for both the oxidizer and fuel over a temperature range of 150 R to 1200 R to size the inlet diameter using engine balance mass flowrates for LOX and GH2 of 108 lbm/s and 16.7 lbm/s. It was concluded that the temperature of either an inlet oxidizer or fuel should be in the range where the oxidizer or fuel is in a gaseous phase, and on the order of approximately 700 R so as to reasonably size the centerbody diameter (i.e., greater than $\geq 1.5$ inches), and thus enable centerbody fuel injection.

Based on these preliminary studies, swirl combustion technology can be applied to several typical liquid propellant rocket engine cycles, as shown in FIGS. 4A through 4D, including: the very simple Gas Pressurize Feed System (FIG. 4A), Open Cycle Gas Generator Turbo-pump Feed System (FIG. 4B), Closed Cycle Expander Cycle (FIG. 4C), and Closed Cycle Staged Combustion Turbo-pump Feed System (FIG. 4D), which can be further divided into a Fuel Rich Stage Combustion Cycle, Oxidizer Rich Stage Combustion Cycle or a Full Flow Stage Combustion Cycle.

Figures 4A, 4C:
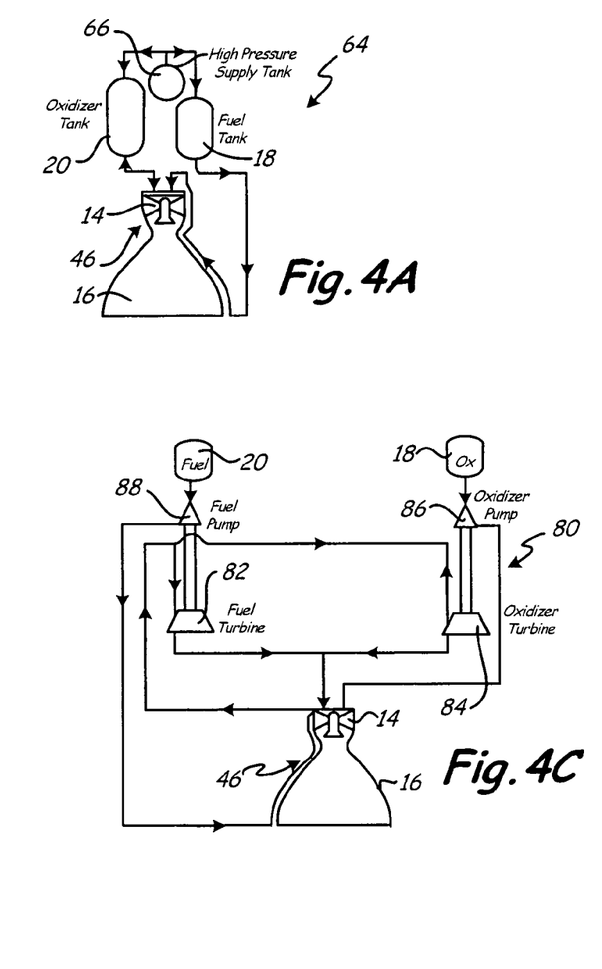
FIG. 4A shows a schematic of a gas pressure feed system for use with the swirl combustion rocket engine of FIG. 1.
FIG. 4C shows a schematic of a closed cycle expander turbopump feed system for use with the swirl combustion rocket engine of FIG. 1.

FIG. 4A shows a schematic of a first embodiment of feed system 21, comprising gas pressure feed system 64, which can be used with swirl combustion rocket engine 10 of FIG. 1. Gas pressure feed system 64 comprises a simple pressurized system to force liquid fuel and oxidizer propellants A and B from storage tanks 18 and 20, respectively. High pressure gas from tank 66 is fed into liquid oxidizer and liquid fuel propellant storage tanks 18 and 20 to provide a controlled propellant discharge. Accordingly, propellants A and B are routed into combustor 46 where swirl-enhanced combustion takes place with swirl generator 14. As shown in FIG. 4A, the liquid fuel, such as liquid hydrogen or liquid methane, is initially discharged from storage tank 18 and used as a coolant to cool convergent/divergent nozzle 16 and combustor 46, which then delivers gaseous H2 or gaseous CH4, along with LOX, to combustor 46. This type of a feed system is very simple and quite reliable, however, this engine cycle is limited in practice to relatively low tank pressures and low main combustion chamber pressures ($P_c$).

Improvements in fuel delivery performance over simple pressurized systems are achieved by using turbo-pump rocket feed systems. There are two classes of turbo-pump rocket engine cycles, namely, open cycles and closed cycles. An open cycle is when the working fluid exhausted from the turbine is discharged overboard, after it has been expanded in a nozzle of its own or in the main engine nozzle. Whereas in a closed turbo-pump fed cycle rocket engine all the working fluids from each of the turbines are injected into the combustion chamber to maximize the energy release and therefore maximize thrust. In general, closed cycle fed systems are more efficient than open cycles, however, they are more complex.

Figure 4B:
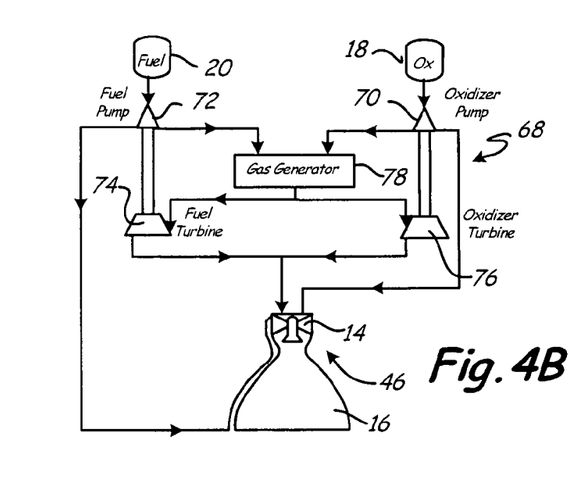
FIG. 4B shows a schematic of an open cycle gas generator turbopump feed system for use with the swirl combustion rocket engine of FIG. 1.

FIG. 4B shows a schematic of a second embodiment of feed system 21, comprising open cycle Gas Generator Turbopump feed system 68, which can be used with swirl combustion rocket engine 10 of FIG. 1. In turbo-pump rocket feed system 68, liquid rocket propellants A and B are pressurized by pumps 70 and 72, which are driven by turbines 74 and 76. Gas generator 78 receives propellants A and B from pumps 70 and 72 in order to carryout a combustion process for generating hot gasses. The hot gases are then used to power turbines 74 and 76, and then expelled from feed system 68 at convergent/divergent nozzle 16. Turbines 74 and 76 then, in addition to supplying generator 78, supply propellants A and B to combustor 46. In FIG. 4B, the mixture ratio of propellants A and B distributed by gas generator 78 are set such that propellants A and B are burned at less-than-optimized mixture ratio to ensure that the temperature is low enough so that turbine blades within fuel turbine 74 and oxidizer turbine 76 do not have to be cooled. Hence, this cycle is appropriate for moderate thrust engines; as opposed to high thrust engines, which would have to divert a large portion of the main flow to the less efficient gas generator.

Figure 4D:
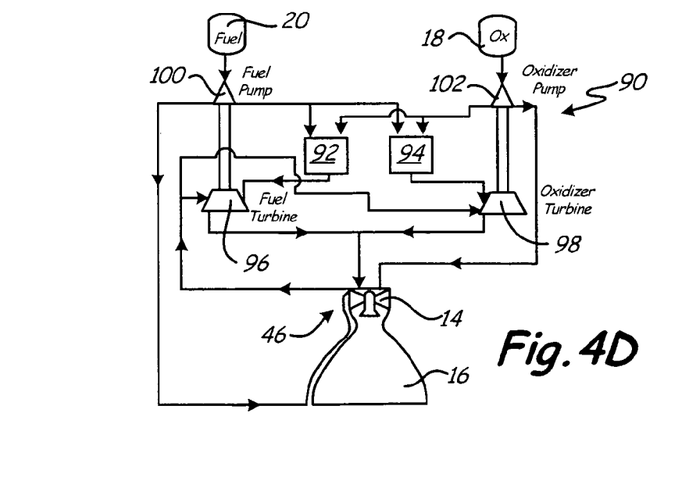
FIG. 4D shows a schematic of a closed cycle staged combustion turbopump feed system for use with the swirl combustion rocket engine of FIG. 1.

FIGS. 4C and 4D show examples of closed cycle turbopump feed systems that can be used in rocket engine 10. In a closed turbo-pump fed cycle rocket engine all the working fluids from each of the turbines are injected into the combustion chamber to maximize the energy release and therefore maximize thrust. In general, closed cycle fed systems are more efficient than open cycles, however, they are more complex. FIG. 4C shows a schematic of a third embodiment of feed system 21, comprising closed cycle expander turbopump feed system 80, which can be used with swirl combustion rocket engine 10 of FIG. 1. Expander cycle 80 includes turbines 82 and 84, and pumps 86 and 88, which operate in a similar fashion to those of feed system 68. However, rather than generating turbine power with a dedicated gas generator, turbines 82 and 84 are operated using gas generated by routing propellant A around the convergent/divergent nozzle 16 and combustor 46. The fuel, propellant A, is routed along the convergent/divergent nozzle 16 and combustor 46 to cool those components as it passes by. The heat from a cooling jacket surrounding the convergent/divergent nozzle 16 and combustor 46 vaporizes propellant A into a gaseous phase, which is then passed through turbines 82 and 84 and injected into combustor 46 and burned with the oxidizer, propellant B. No fuel is dumped overboard as is done with the gas generator feed system of FIG. 4B. However, the heat transfer to the fuel from combustor 46 and nozzle 16 limits the power available to turbines 82 and 84. Thus, feed system 80 is more appropriate for small to mid-size rocket engines. Feed system 80 works best with fuels such as hydrogen or methane, since they have a low boiling point and thus can be easily vaporized.

FIG. 4D shows a schematic of a fourth embodiment of feed system 21, comprising closed cycle staged combustion turbopump feed system 90, which can be used with swirl combustion rocket engine 10 of FIG. 1. Feed system 90 is similar to closed cycle expander turbopump feed system 80 of FIG. 4C except preburners 92 and 94 are added to vaporize the fuel, rather than relying solely on regenerative heat transfer vaporizing during cooling of convergent/divergent nozzle 16 and combustor 46. In feed system 90 propellants A and B are burned in stages in preburners 92 and 94 to produce gas to operate turbines 96 and 98. Preburners 92 and 94 are provided with a small amount of one of the propellants and a large amount of the other propellant by pumps 100 and 102 to produce either an oxidizer-rich or fuel-rich hot gas mixture that consists of mainly unburned vaporized propellant. This hot gas is then directed through turbines 96 and 98, injected into combustor 46 and burned. Likewise, as with feed system 80, pumps 100 and 102 also provide propellant A and B directly to combustor 46. Propellant A is also routed past nozzle 16 and combustor 46 for cooling purposes, which results in a second vaporized gas for powering turbines 96 and 98. Unlike the gas generator cycle of FIG. 3B, stage-combustion cycle of feed system 90 burns propellants A and B in combustor 46 at an optimum mixture ratio and no propellants are dumped overboard. Thus, the stage-combustion cycle of feed system 90 is capable of operating at higher pressures and generating higher thrust levels and higher $I_{sp}$ for higher power rocket applications. The advantage of operating at higher combustion chamber $P_c$'s, results in smaller and lighter rocket engines to produce an equivalent amount of thrust. Conversely, the disadvantages of this type of rocket engine cycle include: (a) high development cost resulting from greater system complexity as a result of operating at this higher pressure level; (b) complexity of the turbine(s); (c) high temperature piping of propellants; and (d) a very complex feedback control system. Examples of rocket engine that utilize the fuel-rich stage-combustion engine cycle are SSME (Space Shuttle Main Engine) and RS-68 and the RD-180 engine (Russian engine) which operate with an oxidizer-rich stage combustion engine cycle. These types of rocket engine cycles are more appropriate for a large scale booster size engine.

In summary, advanced swirl combustion technology, as described herein, can be incorporated into small to medium size thrust producing liquid rocket engines to improve performance, reduce size and weight and provide wide throttling capability. The most applicable rocket engine cycles conducive to generating small to medium thrust with advanced swirl combustion and at the same time employing a regenerative heat transfer cooling approach to cool the rocket engine main combustion chamber and nozzle, include: a gas pressure feed system and/or a Gas Generator (turbo-pump open cycle) and Expander (turbo-pump closed cycle) pump driven feed system. The staged-combustion cycle is better suited for very high thrust producing rocket engines, accompanied by an increase in system complexity. For example, SSME rocket engine, which employs a fuel-rich staged-combustion cycle, produces a vacuum thrust level of 491,000 $lb_f$ (~2,184.08 kN), which is almost a factor of 5 greater than the maximum targeted thrust level of the invention of this application.

All of the aforementioned rocket engine cycles in FIG. 4A to FIG. 4D have in common the fact that the delivered propellant to the rocket injector elements and swirl generator 14 include a cryogenic propellant, LOX (liquid oxygen), and either gaseous hydrogen (GH2) or gaseous methane (GCH4). Delivery of a gaseous propellant to the injectors or the swirl generator 14 is a result of initially using the fuel (hydrogen or methane) as a regenerative heat transfer coolant to cool the nozzle/combustion chamber (FIGS. 4A-4D). For swirl generator 14, propellant A would be either GH2 or GCH4 and propellant B would be LOX. In other embodiments, GOX and liquid Kerosene (LRP) can be used with swirl generator 14 in an oxidizer rich staged combustion cycle, as have been used in the Russian RD-180 rocket engine. The swirl combustion technology could also employ propellant constituents that are gas/gas, instead of liquid/gas. Liquid propellant injectors 32, 34, 36, 38, 40, 42 and 44 (FIGS. 2A and 2B) are sized appropriately for each fuel, with additional injectors at more injector locations if needed, to overcome a decrease in injector momentum and thus penetration as a result of switching from a liquid to a gas.

As mentioned in the background section, current state-of-the-art for pressure feed systems achieve throttling ratios of approximately 10:1, while conventional turbo-pump feed systems using cryogenic fuels achieve throttling ratios of approximately 5:1. Studies indicate that conventional turbo-pump-fed engines could achieve 10:1 throttling ratios, however, only with significant technology advancement. Combustor 46, which incorporates CASP technology, and feed systems 64, 68, 80 and 90 can be further combined in a dual-throat expansion/deflection rocket engine to achieve the desired single-engine architecture-propulsion enabling objectives for NASA's Exploration Systems Architecture Study with an increased throttling ratio.

Figure 5:
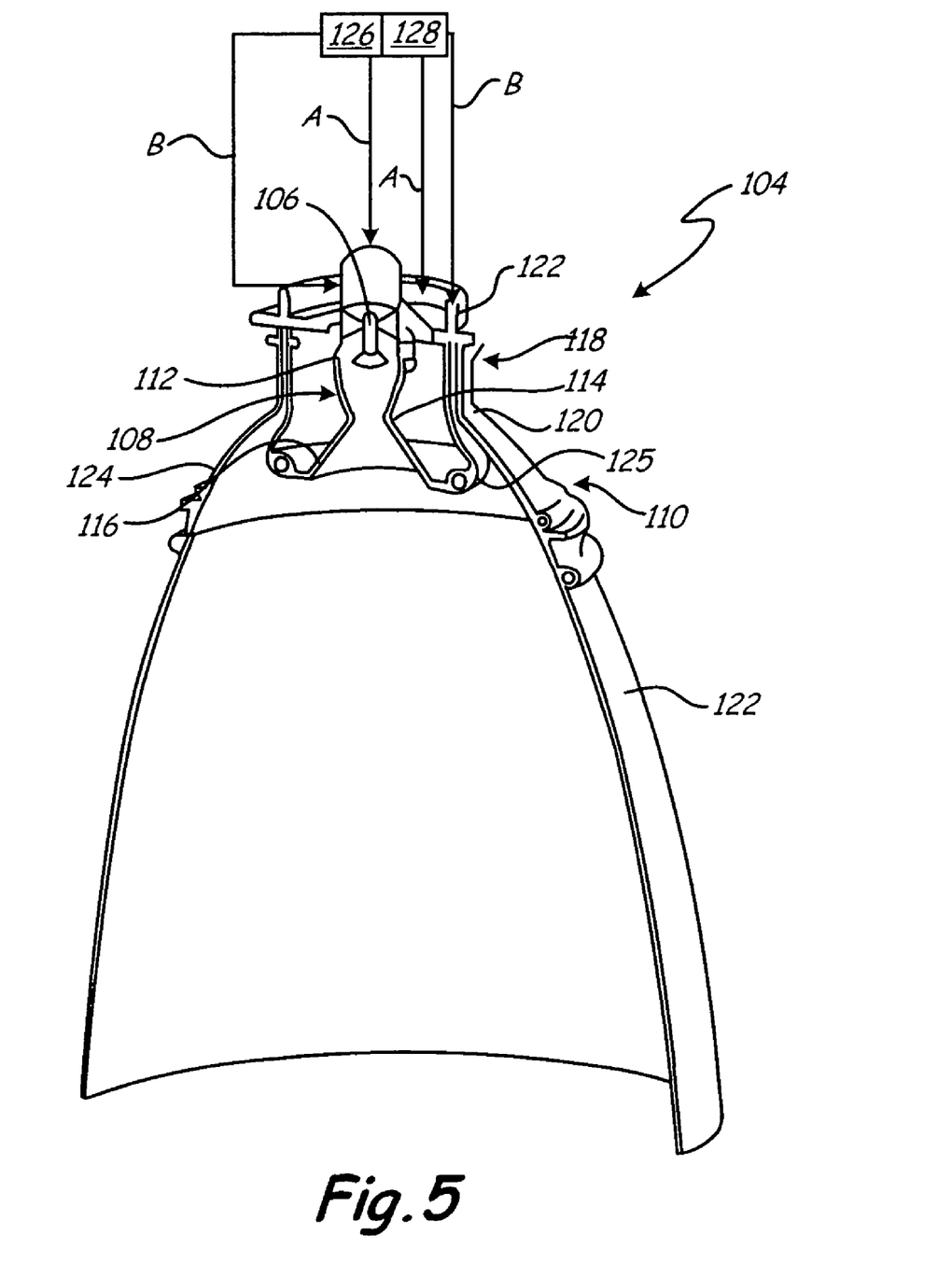
FIG. 5 shows a high thrust, dual-throat, expansion/deflection rocket engine with a swirl generator integrated into an interior thrust chamber to provide deep engine throttleability.

FIG. 5 shows high thrust, dual-throat, expansion/deflection rocket engine 104 with swirl generator 106 integrated into interior thrust chamber assembly 108, which is nested within exterior thrust chamber assembly 110 to provide deep engine throttleability. Interior thrust chamber assembly 108 comprises combustion chamber 112, throat section 114 and nozzle expansion section 116. Exterior thrust chamber assembly 110 comprises combustion chamber 118, throat section 120 and nozzle expansion section 122. Dual-throat deflection rocket engine 104 achieves a large area ratio adjustment within a single thrust chamber assembly without the need for extendable nozzles.

Interior thrust chamber assembly 108 is disposed within exterior thrust chamber assembly 110 such that nozzle 116 discharges directly into nozzle 122, as is described in U.S. Pat. No. 4,220,001 to Rudi Beichel, which is herein incorporated by this reference. The dual-throat technology is also described in "Single-Stage-to-Orbit Propulsion: Concepts and their Merit", by R. Beichel and C. O'Brien, AIAA/SAE 14th Joint Propulsion Conference, Las Vegas, Nev., Jul. 25-27, 1978. However, the dual-throat technology is improved upon by incorporating swirl generator 106 and feed systems of the present invention, as well as other improvements.

The expansion section of nozzle 116 of interior thrust chamber assembly 108 can be conical as shown in FIG. 5 or bell shaped, whereas exterior nozzle 122 of exterior thrust chamber assembly 110 is bell shaped. The expansion angle of nozzle 116 is less than that of nozzle 122. The minimum area between interior thrust chamber assembly 108 and exterior thrust chamber assembly 110 occurs at the location of exterior nozzle throat section 120 and then increases with increasing length of external nozzle 122. High thrust dual-throat deflection rocket engine 104 incorporates a two-stage exterior nozzle. Main expansion/deflection nozzle 124 (which is well suited to high expansion ratio, high performance, in-space applications) immediately extends from throat section 120, while the secondary, smaller, highly throttleable interior thrust chamber assembly 108 embedded in the expansion/deflection nozzle 125 extends from the main expansion/deflection nozzle 124. Expansion/deflection nozzle 125, which is disposed between nozzle 116 and nozzle 122, consists of an outwardly oriented annular throat and an outer wall contour to deflect the exhaust combustion gases into nearly an axial direction.

Interior thrust chamber assembly 108 and swirl generator 106 are configured similarly to swirl generator 14 and combustor 46 (FIG. 2B) or combustor 12 (FIG. 2A), respectively, to achieve advanced swirl combustion of propellants A and B with or without a dump-step. Numerous fuel injectors, such as injectors 32 through 44 of FIGS. 2A, 2B and 3, are provided within combustion chamber 112, whereas, exterior chamber assembly 110 employs typical liquid/gas rocket injector elements 130 to improve propulsion performance of dual-throat expansion/deflection rocket engine 104 and to reduce its size and weight. To further enhance swirl generator 106 mounted inside interior thrust chamber assembly 108 with deep fuel throttling capability, a "dual injector" design approach having a dual-orifice simplex nozzle design, that features both high flow rate and low flow rate injectors can be integrated into the same fuel injection scheme. Then, manifolding and control of flows of propellants A and B can be accomplished externally to combustion chamber 112. This fuel injection approach has previously been successfully implemented for gas turbine fuel injection application where a high degree of throttling is required. Alternatively, fuel injectors with variable area capability can be utilized. Exterior thrust chamber assembly 110 employs liquid/gas rocket injector elements 130. Since there are combustion stability issues in maintaining chugging instability mirgins associated with combustion of liquid phase propellants, in which case stability aids such as baffles and/or acoustic cavities are employed in both combustion chamber assemblies to minimize potential combustion stability modes. Introduction of swirl in general, and swirl generator 106 in particular, can substantially minimize or eliminate this problem altogether, as was shown in the U.S. Pat. No. 6,820,411 by Pederson, et al.

The key to achieving deep engine throttling across a wide thrust range is the operation of each combustion chamber assembly separately or in combination to achieve the required mission thrust. Interior thrust chamber assembly 108 is fed by small pressure or pump system 126, which comprises a feed system similar to that of gas pressure feed system 64 of FIG. 4A or expander turbopump feed system fed 80 of FIG. 4C. In other embodiments, other combinations of feed systems 64, 68 and 80 of FIGS. 4A-4C can be used. Exterior thrust chamber assembly 110 engine is fed by large pressure or pump system 128, which comprises an expander turbo-pump feed system similar to that of feed system 80 of FIG. 4C. Feed system 126 provides propellants A and B to combustion chamber 112 in a highly throttlable manner such that a wide range of thrusts are achieved. Feed system 128 provides propellants A and B to combustion chamber 118 for high thrust and low throttling operations.

High thrust dual-throat expansion/deflection rocket engine 104 is designed to operate in two modes. Mode I is referred to as the boost mode, and can be further sub-divided into two additional modes, modes 1$a$ and 1$b$. In the boost mode 1, when the thrust requirements are higher (trans-earth and trans-lunar insertion) and only a moderate amount of throttling is required, either just the exterior thrust chamber assembly 110 is utilized (mode 1$a$) or both the exterior and interior thrust chamber assemblies 110 and 108 are activated (mode 1$b$). In mode 1$a$, the expansion/deflection nozzle 125 of exterior thrust chamber assembly 110 is capable of about 5:1 throttling, and can deliver between approximately 12,000 $lb_f$ and 60,000 $lb_f$ of vacuum thrust. Conversely, interior thrust chamber assembly 108, is capable of approximately 20:1 throttling, delivering thrust between about 500 $lb_f$ and approximately 10,000 $lb_f$ and is most prominent for mode 2, which can address orbital maneuvering (approximately 500 $lb_f$ to 3,000 $lb_f$), Lunar Landing (approximately 1,500 $lb_f$-10,000 $lb_f$) and Lunar Ascent (about 5,000 $lb_f$ to 10,000 $lb_f$). Thus, this wide, dual-mode operating range allows a single integrated engine system to be used for all of NASA's main space propulsion needs to support the ESAS propulsion architecture to travel to the Moon and beyond.

Implementation of the compact advanced swirl combustion propulsion technology into dual-throat expansion/deflection rocket engine 104, as recited heretofore, offers the following benefits: improved propulsion performance, reduced length and weight, elimination of combustion instability issues, hardware simplification, higher operational reliability, and last but not least—lower costs.

Although the present invention has been described with reference to preferred embodiments, workers skilled in the art will recognize that changes may be made in form and detail without departing from the spirit and scope of the invention.

The invention claimed is:

1. A rocket engine comprising:
   a combustor chamber;
   an inlet delivery duct coaxial with said combustion chamber;
   a plurality of liquid propellant injectors mounted to said inlet delivery duct;
   a swirl generator mounted to said inlet delivery duct, said swirl generator comprising a plurality of swirl vanes radially distributed within said inlet delivery duct and a flared bluffbody mounted to said plurality of swirl vanes to extend at least partially downstream of said plurality of liquid propellant injectors, at least one of said plurality of liquid propellant injectors are defined by said flared bluffbody; and
   a feed system to transport a liquid oxidizer and a liquid fuel, said feed system operable to convert either the liquid fuel or the liquid oxidizer to a gaseous state for communication upstream of said swirl generator, the other of said liquid oxidizer and said liquid fuel for communication to said liquid propellant injectors.

2. The rocket engine of claim 1 further comprising a first nozzle downstream of said combustor chamber.

3. The rocket engine of claim 2 further comprising an exterior thrust chamber assembly concentrically positioned around said first nozzle such that said first nozzle discharges into said exterior thrust chamber assembly.

4. The rocket engine of claim 3 wherein said exterior thrust chamber assembly further comprises:
   a main exterior nozzle connected to an exterior throat and concentrically positioned around said first nozzle;
   a secondary exterior nozzle extending from said main exterior nozzle; and
   a deflection nozzle disposed between said main exterior nozzle and said first nozzle.

5. The rocket engine of claim 1 wherein the feed system routes either the liquid oxidizer or the liquid fuel along the combustor chamber to transfer heat from the combustor chamber to convert the liquid oxidizer or the liquid fuel to the gaseous state.

6. The rocket engine of claim 4 and further comprising a dump step positioned between the swirl vanes and the dump step.

7. The rocket engine of claim 4 wherein the swirl vanes have a diameter of approximately 17.272 cm (6.8 inches).

8. The rocket engine of claim 6 wherein the swirl generator further comprises a centerbody having a diameter of at least approximately 3.81 cm (1.5 inches) positioned between the swirl vanes and the bluffbody.

9. The rocket engine of claim 1 wherein the feed system comprises a gas pressure feed system incorporating a regenerative heat transfer system.

10. The rocket engine of claim 1 wherein the feed system comprises a turbo-pump feed system incorporating a regenerative heat transfer system.

11. The rocket engine of claim 10 wherein the turbo-pump feed system comprises a closed loop.

12. The rocket engine of claim 10 wherein the turbo-pump feed system includes a pre-burner to gasify either the oxidizer or the fuel.

13. The rocket engine of claim 4, wherein said deflection nozzle includes an outwardly oriented annular throat and an outer wall contour to deflect combustion gases into a nearly axial direction.

14. The rocket engine of claim 1, wherein said swirl generator produces a turbulent flowfield of the fuel and oxidizer rocket propellants within said combustor chamber.

15. The rocket engine of claim 14, wherein said combustor chamber at least partially contains a combustion process of the fuel and oxidizer rocket propellants so as to produce thrust.

16. The rocket engine of claim 1, wherein at least one of said plurality of liquid propellant injectors are defined by a centerbody of said flared bluffbody.

17. A rocket engine comprising:
   a combustor chamber;
   a plurality of liquid propellant injectors in communication with said combustor chamber;
   a swirl generator at least partially within said combustor chamber, said swirl generator comprising a plurality of swirl vanes which support a bluffbody which extends at least partially downstream of said plurality of liquid propellant injectors, at least one of said plurality of liquid propellant injectors are defined by said bluffbody; and
   a feed system to transport a liquid oxidizer and a liquid fuel, said feed system operable to convert either the liquid fuel or the liquid oxidizer to a gaseous state for communication upstream of said swirl generator, the other of said liquid oxidizer and said liquid fuel for communication to said liquid propellant injectors.

18. The rocket engine of claim 17, wherein said bluffbody is defined along a centerling of said combustor chamber.

19. The rocket engine of claim 18, wherein said bluffbody is a flared bluffbody.

20. The rocket engine of claim 18, wherein said bluffbody is a solid-flared conical bluffbody.

21. The rocket engine of claim 17, wherein said bluffbody is a channeled bluffbody.

22. The rocket engine of claim 17, wherein said combustor chamber defines a combustor length to diameter ratio, L/D, of less than 1.6.

* * * * *